(12) United States Patent
Tokizaki et al.

(10) Patent No.: US 9,837,776 B2
(45) Date of Patent: Dec. 5, 2017

(54) ELECTRIC MOTOR

(71) Applicant: Mitsuba Corporation, Gunma (JP)

(72) Inventors: Teppei Tokizaki, Kiryu (JP);
Yoshichika Kawashima, Kiryu (JP);
Natsumi Tamura, Kiryu (JP)

(73) Assignee: Mitsuba Corporation, Gunma (JP)

( * ) Notice: Subject to any disclaimer, the term of this patent is extended or adjusted under 35 U.S.C. 154(b) by 223 days.

(21) Appl. No.: 14/900,727

(22) PCT Filed: Jul. 10, 2014

(86) PCT No.: PCT/JP2014/068488
§ 371 (c)(1),
(2) Date: Dec. 22, 2015

(87) PCT Pub. No.: WO2015/005445
PCT Pub. Date: Jan. 15, 2015

(65) Prior Publication Data
US 2016/0134073 A1    May 12, 2016

(30) Foreign Application Priority Data

Jul. 11, 2013  (JP) ................................. 2013-145711
Jul. 11, 2013  (JP) ................................. 2013-145712

(51) Int. Cl.
*H02K 11/00* (2016.01)
*H01R 39/38* (2006.01)
(Continued)

(52) U.S. Cl.
CPC ............ *H01R 39/383* (2013.01); *B60S 1/166* (2013.01); *H01R 39/40* (2013.01); *H02K 5/145* (2013.01);
(Continued)

(58) Field of Classification Search
CPC ...... H02K 5/145; H02K 5/225; H02K 11/026; H02K 13/006; H02K 23/66
(Continued)

(56) References Cited

U.S. PATENT DOCUMENTS 3,041,118 A * 6/1962 Campbell ............ H01H 11/045
                                                   200/283
4,085,346 A * 4/1978 Yoshida ................. H01R 39/39
                                                   310/246

(Continued)

FOREIGN PATENT DOCUMENTS

CN       1604428 A    4/2005
CN       1808850 A    7/2006
(Continued)

OTHER PUBLICATIONS

Chinese Patent Office, Office Action issued in Chinese Patent Application No. 201480035913.5 dated May 25, 2017, 17 pages.
(Continued)

*Primary Examiner* — Thanh Lam
(74) *Attorney, Agent, or Firm* — Wood Herron & Evans LLP

(57) ABSTRACT

In an electric motor, a brush holder stay (33) has an opening section through which a commutator (23) is able to be inserted in a rotary shaft direction (O1), brush holders (41) extend in the rotary shaft direction (O1) and are formed in a flat spring shape biased toward the inside in a radial direction, base end sections of the brush holders (41) are supported by the brush holder stay (33) at intervals in a circumferential direction around the rotary shaft (3), and brushes (31) are held by the front end sections of the brush holders (41).

12 Claims, 9 Drawing Sheets

(51) Int. Cl.
*B60S 1/16* (2006.01)
*H02K 5/14* (2006.01)
*H02K 5/22* (2006.01)
*H02K 7/116* (2006.01)
*H02K 13/00* (2006.01)
*H01R 39/40* (2006.01)
*H02K 11/026* (2016.01)
*H02K 11/21* (2016.01)
*H02K 23/66* (2006.01)

(52) U.S. Cl.
CPC .......... *H02K 5/225* (2013.01); *H02K 7/1166* (2013.01); *H02K 11/026* (2013.01); *H02K 11/21* (2016.01); *H02K 13/006* (2013.01); *H02K 23/66* (2013.01); *H02K 2213/03* (2013.01)

(58) Field of Classification Search
USPC .......... 310/71, 231–233, 239–247, 310/154.06–154.09, 154.36
See application file for complete search history.

(56) References Cited

U.S. PATENT DOCUMENTS

| | | | | |
|---|---|---|---|---|
| 4,088,912 | A * | 5/1978 | Yoshida | H01R 39/39 310/244 |
| 4,746,829 | A * | 5/1988 | Strobl | H01R 39/39 310/239 |
| 6,201,326 | B1 | 3/2001 | Klappenbach et al. | |
| 2001/0013728 | A1* | 8/2001 | Harita | H02K 5/145 310/71 |
| 2005/0116577 | A1* | 6/2005 | Busse | H01R 39/39 310/239 |
| 2005/0218750 | A1 | 10/2005 | Suminski | |
| 2006/0208586 | A1 | 9/2006 | Guttenberger | |
| 2009/0121580 | A1* | 5/2009 | Viernekes | H01R 39/381 310/242 |
| 2009/0255186 | A1* | 10/2009 | Uchimura | H02K 5/148 49/358 |
| 2011/0283622 | A1 | 11/2011 | Yoshida et al. | |
| 2012/0212080 | A1 | 8/2012 | Jiang et al. | |

FOREIGN PATENT DOCUMENTS

| | | |
|---|---|---|
| DE | 102005015549 A1 | 10/2006 |
| DE | 102005047428 A1 | 4/2007 |
| EP | 0521528 A1 | 1/1993 |
| EP | 0603083 A1 | 6/1994 |
| EP | 2228874 A1 | 9/2010 |
| GB | 902557 A | 8/1962 |
| JP | 07033759 | 6/1995 |
| JP | 2001037288 A | 2/2001 |
| JP | 2003-523708 A | 8/2003 |
| JP | 2006151133 A | 6/2006 |
| JP | 2008-035629 A | 2/2008 |
| JP | 2009064675 A | 3/2009 |
| JP | 4335462 B2 | 9/2009 |
| JP | 2010-110111 A | 5/2010 |
| JP | 2010-142027 A | 6/2010 |
| JP | 2010213464 A | 9/2010 |
| JP | 2011-234438 A | 11/2011 |
| JP | 2012-125024 A | 6/2012 |
| JP | 2013-063019 A | 4/2013 |
| WO | 2012077540 A1 | 6/2012 |
| WO | 2012168128 A1 | 12/2012 |

OTHER PUBLICATIONS

European Patent Office, Search Report issued in corresponding European Patent Application No. 14822256.5 dated Feb. 10, 2017, 11 pages.

Japanese Patent Office, Notice of Allowance issued in corresponding Japanese Patent Application No. 2013-145711 dated Jan. 17, 2017, 6 pages.

Japanese Patent Office, International Search Report issued in corresponding International Patent Application No. PCT/JP2014/068488 and English-language translation dated Sep. 16, 2014.

* cited by examiner

ELECTRIC MOTOR

TECHNICAL FIELD

The present invention relates to an electric motor.

Priority is claimed on Japanese Patent Application No. 2013-145712, filed Jul. 11, 2013, and Japanese Patent Application No. 2013-145711, filed Jul. 11, 2013, the contents of which are incorporated herein by reference.

BACKGROUND ART

In the related art, a 3-brush type electric motor that can switch a rotational speed is used as a wiper motor for an automobile. In such an electric motor, a plurality of magnets are disposed on an inner circumferential surface of a bottomed cylindrical yoke at intervals in a circumferential direction, and an armature is rotatably disposed inside the magnets.

The armature includes an armature core fitted onto a rotary shaft, an armature coil wound on the armature core, and a commutator fitted onto the rotary shaft adjacent to the armature core.

In the commutator, a plurality of segments are disposed in a circumferential direction in an insulated state from each other. Distal end sections of the armature coil are respectively connected to the segments.

In addition, a plurality of brushes come into sliding contact with the segments at intervals in the circumferential direction, and electricity is supplied to the armature coils via the brushes.

The brushes are constituted by a brush for a low speed and a brush for a high speed, and a common brush commonly used for the brushes, and are held at brush holder stay via brush holders. In addition, the brush for a low speed and the common brush are disposed at positions spaced 180° from each other at an electrical angle (mechanical angle×the number of pole pairs). The brush for a high speed is disposed to be spaced a predetermined angle from the brush for a low speed in the circumferential direction. Then, as the electrical connection to the brush for a low speed and the brush for a high speed is selectively switched, the speed of the electric motor can be switched.

Here, in the following Patent Literature 1, in an electric motor having a 2-pole-3-brush structure in which the number of magnetic poles is 2 and the number of brushes is 3, a configuration of a so-called hammer brush in which a brush holder is formed in a flat spring shape is disclosed. Specifically, the hammer brush disclosed in Patent Literature 1 includes a U-shaped brush holder stay having a main wall section and a pair of sidewall sections extending from both end sections of the main wall section, a plurality of brush holders extending in the circumferential direction and biased inward in the radial direction, and brushes fixed to protrude inward in the radial direction from front end sections of the brush holders.

In the brush holders, the base end sections are supported on a main wall section of the brush holder stay at intervals in the circumferential direction. And, the brush holders are inclined inward in the radial direction toward the front end sections. Then, in the electric motor of Patent Literature 1, the brush for a low speed and the common brush come into sliding contact with the commutator from positions spaced a mechanical angle of 180° from each other, and the brush for a high speed comes into sliding contact with the commutator from a position spaced a predetermined angle from the brush for a low speed.

When the above-mentioned hammer brush is assembled to the armature, first, as the brush holders are pressed in a direction against a biasing force by a jig or the like, an interval between the brushes is expanded (an opening process). Next, in a state in which the opening section of the brush holder stay (a gap between the sidewall sections) and the commutator are faced to each other in the radial direction, the brush holder stay approaches the commutator in the radial direction (an assembly process). Accordingly, the commutator is inserted into the brush holder stay, and the commutator is disposed between the brushes. After that, as the pressing against the brush holders is released, the brush holders are recovered and the brushes of the brush holders are held in contact with the segments.

In addition, in the related art, in order to wipe out dust, raindrops, or the like, stuck to a windshield or the like of a vehicle such as an automobile, a wiper motor configured to swing a wiper arm, on which a wiper blade is mounted, within a predetermined range on the windshield is known.

Such a wiper motor includes an electric motor serving as a driving source, a speed reduction mechanism configured to reduce a speed of rotational driving force of the electric motor and to output, and a gear housing configured to accommodate the speed reduction mechanism, the brush holders of the electric motor, the commutator, or the like (for example, see the following Patent Literature 2).

The gear housing has a frame section formed of a metal in a bottomed cylindrical shape, and a bottom plate configured to close an opening section of the frame section. A connector, a wiring section configured to electrically connect the connector and the electric motor (the commutator), a contact plate configured to detect a rotational position of the speed reduction mechanism, and so on, are disposed at the bottom plate.

CITATION LIST

Patent Literature

[Patent Literature 1] Japanese Patent No. 4335462
[Patent Literature 2] Japanese Patent Application, Publication No. 2012-125024

SUMMARY OF INVENTION

Technical Problem

In recent years, there have been cases in which the wiper motor is multipolarized such that the number of magnetic poles is 4 (the number of pole pairs is 2) to provide a compact and high performance wiper motor (a 4-pole-3-brush structure).

Here, when the above-mentioned hammer brush is employed in the 4-pole-3-brush structure, assembly of the brush holder stay and the armature becomes difficult. That is, in the case of the 2-pole-3-brush structure of Patent Literature 1, a mechanical angle between the brush for a low speed and the common brush is set to be 180° as described above. For this reason, for example, the brush for a high speed can come into contact with the commutator from an entrance side (a main wall section side) in an assembly direction of the brush holder stay, and the brush for a low speed and the common brush can come into contact with the commutator from a direction perpendicular to the assembly direction (the sidewall section side).

On the other hand, in the case of the 4-pole-3-brush structure, there is a need to dispose the brush for a low speed and the common brush at positions spaced a mechanical angle of 90° from each other, and dispose the brush for a high speed to be spaced a predetermined angle from the brush for a low speed in the circumferential direction. For this reason, in order to assemble the brush holder stay to the commutator by the same method as in the above-mentioned Patent Literature 1, for example, the brush for a low speed and the common brush should be disposed at the entrance side in the assembly direction, and the brush for a high speed should be brought around a ending side in the assembly direction (an opening section side of the brush holder stay).

Accordingly, assemblability may deteriorate, and precise disposition of the brushes at desired positions may be difficult.

In addition, in the related art like the above-mentioned Patent Literature 2, the electric motor and the connector should be connected via a wiring section disposed on the bottom plate. For this reason, as the wiring is lengthened and a shape of the terminal becomes complicated, manufacturing cost may increase.

In addition, since the shape of the bottom plate is determined according to parts disposed thereon, as all of the above-mentioned connector, terminal, contactor, and so on, are disposed on the bottom plate, the shape of the bottom plate becomes complicated. Accordingly, the manufacturing cost may increase.

The present invention provides an electric motor in which brushes can be disposed as desired without decreasing assemblability even when multipolarization of four poles or more is attempted.

In addition, the present invention provides an electric motor that enables cost reduction and simplification.

Solution to Problem

According to a first aspect of the present invention, an electric motor includes a yoke having a cylindrical section; magnets disposed at an inner circumferential surface of the cylindrical section and having 4 or more magnetic poles; an armature attached to a rotary shaft and rotatably supported inside the yoke; a plurality of brushes in sliding contact with a commutator of the armature to supply electric power; brush holders holding each of the brushes separately; and a brush holder stay supporting the brush holders. The brush holder stay has an opening section through which the commutator is able to be inserted in an axial direction of the rotary shaft, each of the brush holder extends in the axial direction and is formed in a flat spring shape biased toward the inside in a radial direction perpendicular to the axial direction, and base end sections of the brush holders are supported by the brush holder stay at intervals in a circumferential direction around the rotary shaft and the brushes are held at the front end sections of the brush holders.

According to the configuration, since the brush holders extend in the axial direction, when the commutator (the armature) is inserted through the brush holder stay in the axial direction, an extending direction of the brush holders and an assembly direction of the armature become the same direction. For this reason, the commutator can smoothly enter between the brush holders (the brushes) of the brush holder stay, and assemblability can be improved.

In this case, even when the number of magnetic poles is four or more, the brush holders (the brushes) can be precisely disposed at desired positions in the circumferential direction without a decrease in assemblability.

According to a second aspect of the present invention, in the electric motor according to the above-mentioned first aspect, the brush holder may have the base end section disposed at the armature side in the axial direction, and may be formed gradually away from the armature toward the front end section.

According to the configuration, since the base end sections of the brush holders are disposed at an entrance side in the assembly direction of the armature, when the commutator enters between the brush holders, the commutator enters while expanding the brush holders outward in the radial direction (in a direction against biasing forces of the brush holders). Accordingly, since there is no need to perform the above-mentioned opening process of expanding the brush holders outward in the radial direction using a jig or the like, the number of manufacturing processes and manufacturing cost can be reduced while further improving assemblability.

According to a third aspect of the present invention, in the electric motor according to the above-mentioned first aspect or second aspect, in the segments, the segments configured to be the same potential may be short-circuited by a connecting wire, and the brush may include a brush for a low speed and a brush for a high speed; and a common brush commonly used for the brush for a low speed and the brush for a high speed. The brush for a low speed and the common brush are disposed at an interval of an electrical angle of 180° in a circumferential direction, and the brush for a high speed is disposed in a second region opposite to a first region in the radial direction with the rotary shaft sandwiched therebetween, the first region being disposed between the brush for a low speed and the common brush in the circumferential direction.

According to the configuration, as the brush for a low speed and the common brush are disposed at opposite regions in the radial direction to the brush for a high speed, in comparison with the configuration in which the brush for a high speed is disposed in a first region, contact pressures of the brushes with respect to the segments can be uniformly applied throughout the circumferential direction. Accordingly, shaft misalignment of the rotary shaft can be suppressed, and a motor operating sound can be reduced.

According to a fourth aspect of the present invention, in the electric motor according to the above-mentioned first aspect to third aspect, a connector section is configured to electrically connect the brush and also to connect to the outside may be integrally formed with the brush holder stay, and a distance between the brush for a high speed and the connector section may be smaller than a distance from the brush for a low speed and the common brush to the connector section.

According to the configuration, on the brush holder stay, electric parts such as a noise prevention element, a circuit breaker, or the like, can be disposed in a space from the brush for a low speed and the common brush to the brush for a high speed, and layout characteristics can be improved.

According to a fifth aspect of the present invention, in the electric motor according to the above-mentioned fourth aspect, a noise prevention element may be disposed between the brush and the connector section.

According to the above-mentioned configuration, electromagnetic noise can be reduced.

According to a sixth aspect of the present invention, in the electric motor according to the above-mentioned third aspect to fifth aspect, the brush for a high speed may have a width in the circumferential direction smaller than that of the brush for a low speed and the common brush.

According to the above-mentioned configuration, since the width of the brush for a high speed is smaller in the circumferential direction than those of the other brushes, for example, each of the brush for a low speed and the brush for a high speed can be suppressed from coming into straddling contact with the two neighboring segments in the circumferential direction (short-circuiting). Accordingly, rectification can be improved.

According to a seventh aspect of the present invention, in the electric motor according to the above-mentioned first aspect to sixth aspect, a speed reduction mechanism having a worm connected to the rotary shaft, and a worm wheel to which an output shaft is fixed, meshed with the worm, and configured to reduce rotation speed of the rotary shaft and to output the reduced rotation from the output shaft, and a gear housing accommodating the speed reduction mechanism and the brush holder stay may be provided. A positioning section configured to perform positioning in the axial direction with respect to the gear housing may be formed at the brush holder stay.

According to the configuration, since the brush holder stay and the gear housing can be positioned in the axial direction via the positioning section, after the brush holder stay is assembled to the gear housing, as the armature is assembled to the brush holder stay as described above, the positioning in the axial direction of the armature with respect to the gear housing can be performed. Accordingly, assemblability can be further improved.

According to an eighth aspect of the present invention, in the electric motor according to the above-mentioned seventh aspect, the gear housing may have a bottomed cylindrical frame section accommodating the speed reduction mechanism and a bottom plate closing an opening section of the frame section, a connector section assembled to the gear housing and having a connector terminal connected to the outside and a holder unit at which the brush holder is integrally disposed may be provided, a contact plate extending from the connector terminal toward the worm wheel may be disposed at the connector section, in the gear housing, a relay unit engaged with the worm wheel to be rotated with the worm wheel and with which the contact plate comes into sliding contact may be disposed at the frame section side, and a second positioning section configured to be positioned at the frame section may be formed at the relay unit.

According to the configuration, since the brush holder and the connector section are integrally disposed at the holder unit, in comparison with the configuration in which the electric motor and the connector section are connected via a wiring section of the bottom plate like the related art, a wiring length between the electric motor and the connector section can be reduced, the wiring layout can be simplified, and cost can be reduced.

In addition, as the connector section or the like is disposed at the holder unit and the relay unit is disposed at the frame section side, a function performed by the bottom plate can be reduced (for example, a function of closing the frame section and protecting components in the frame section may be satisfactory).

Since the bottom plate can be simplified, additional reduction in cost can be achieved through the simplification.

Moreover, since the relay unit is positioned at the frame section via the positioning section, the relay unit can be stably held in the gear housing, and assemblability of the electric motor can be improved.

According to a ninth aspect of the present invention, in the electric motor according to the above-mentioned eighth aspect, the connector terminal and the contact plate may be integrally formed with each other and insert-molded in the connector section.

According to the configuration, since the connector terminal and the contact plate are integrally formed and insert-molded in the connector section, the number of parts and the number of manufacturing processes can be reduced.

According to a tenth aspect of the present invention, in the electric motor according to the above-mentioned eighth aspect or ninth aspect, the brushes are routed to the connector section via a jumper cable.

According to the above-mentioned configuration, for example, since the wiring can be flexibly routed in comparison with the configuration in which the brush and the connector section are connected by a bus bar or the like, a degree of freedom of the wiring layout can be improved.

According to an eleventh aspect of the present invention, in the electric motor according to the above-mentioned eighth aspect to tenth aspect, the holder unit may be disposed at a position overlapping the gear housing when seen from the axial direction of the rotary shaft.

According to the configuration, the holder unit (the connector section) does not protrude outward from the gear housing when seen from the axial direction of the rotary shaft. That is, since an external dimension when seen from the axial direction of the holder unit is able to fit within an external dimension of the gear housing, layout characteristics upon attachment to the vehicle body or the like can be improved.

According to a twelfth aspect of the present invention, in the electric motor according to the above-mentioned eighth aspect to eleventh aspect, an attachment piece may be installed at the bottom plate for enabling to attach to a vehicle body or a wiper apparatus.

According to the configuration, the electric motor can be simply attached to the vehicle body or the wiper apparatus via the bottom plate.

Advantageous Effects of Invention

According to the above-mentioned electric motor, even when multipolarization of four poles or more is attempted, desired brushes can be disposed without decreasing assemblability.

In addition, according to the above-mentioned electric motor, cost reduction and simplification can be performed.

DESCRIPTION OF EMBODIMENT

Hereinafter, an embodiment of the present invention will be described based on the accompanying drawings.

<Wiper Motor>

Figure 1:
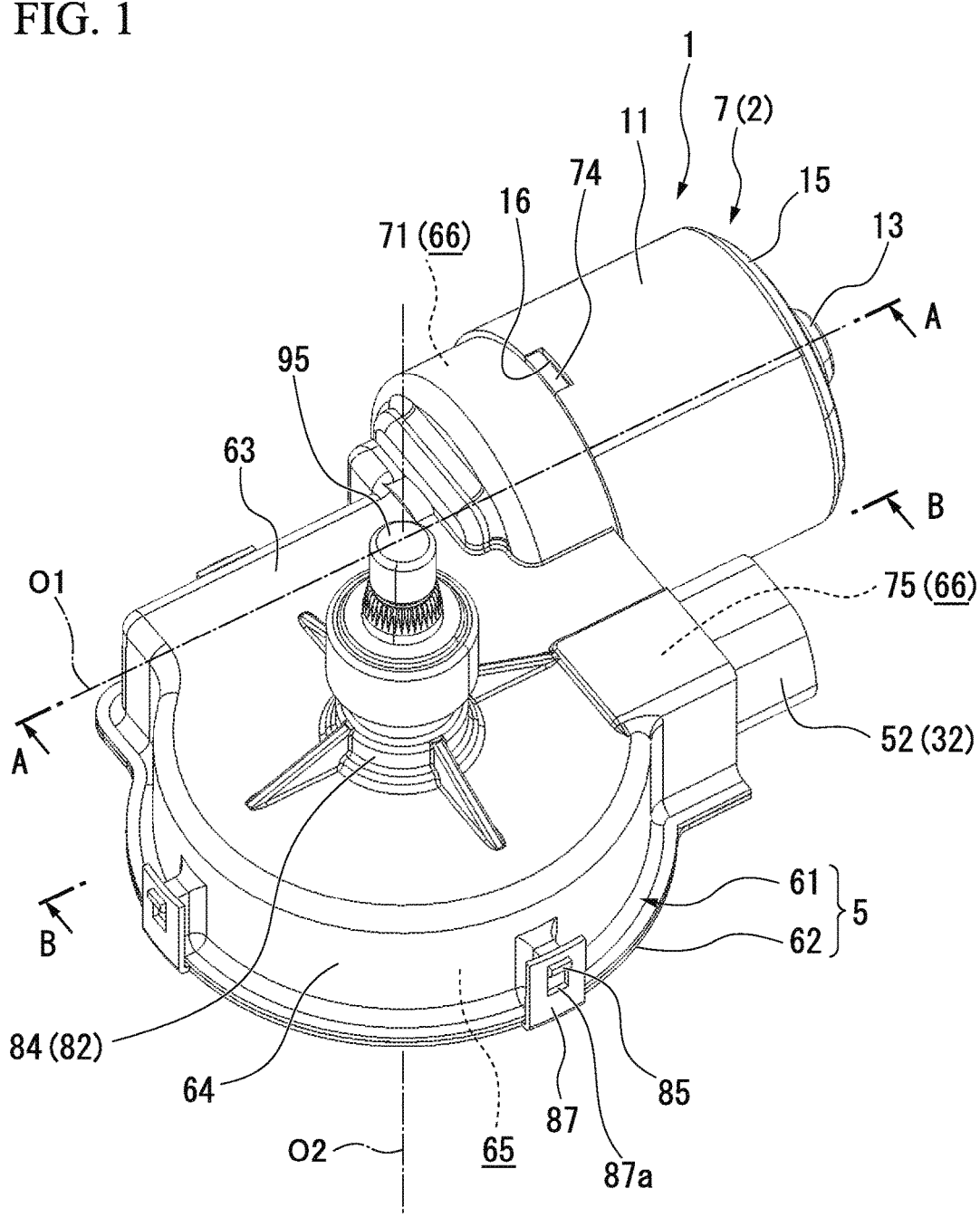
FIG. 1 is a perspective view of a wiper motor according to an embodiment of the present invention.
Figure 2:
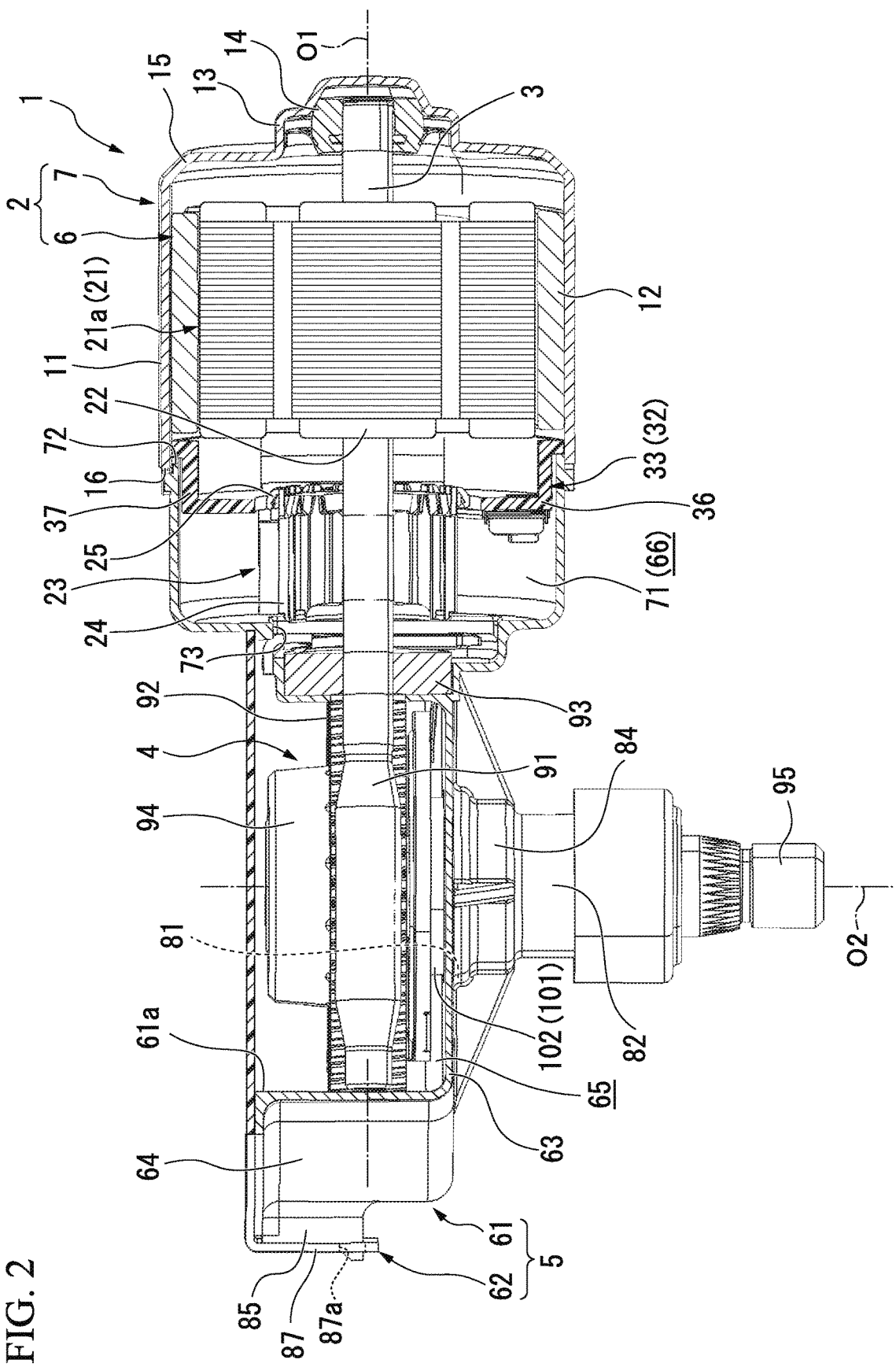
FIG. 2 is a cross-sectional view taken along line A-A of FIG. 1.

FIG. 1 is a perspective view of a wiper motor according to an embodiment of the present invention. FIG. 2 is a cross-sectional view taken along line A-A of FIG. 1.

As shown in FIGS. 1 and 2, a wiper motor 1 of the embodiment drives, for example, a front wiper (a wiper apparatus), which is not shown, configured to wipe a windshield of a vehicle (not shown). Specifically, the wiper motor 1 includes an electric motor 2, a speed reduction mechanism 4 (see FIG. 2) connected to a rotary shaft 3 (see FIG. 2) of the electric motor 2, and a gear housing 5 accommodating a portion of the speed reduction mechanism 4 or the electric motor 2. The wiper motor 1 is configured to transmit a driving force of the electric motor 2 to the front wiper via an output shaft 95 (to be described below) after the speed of the driving force is reduced by the speed reduction mechanism 4. Further, in the following description, an axial direction of the rotary shaft 3 may be referred to as a rotary shaft direction O1, and an axial direction of the output shaft 95 may be referred to as an output shaft direction O2.

<Electric Motor>

Figure 3:
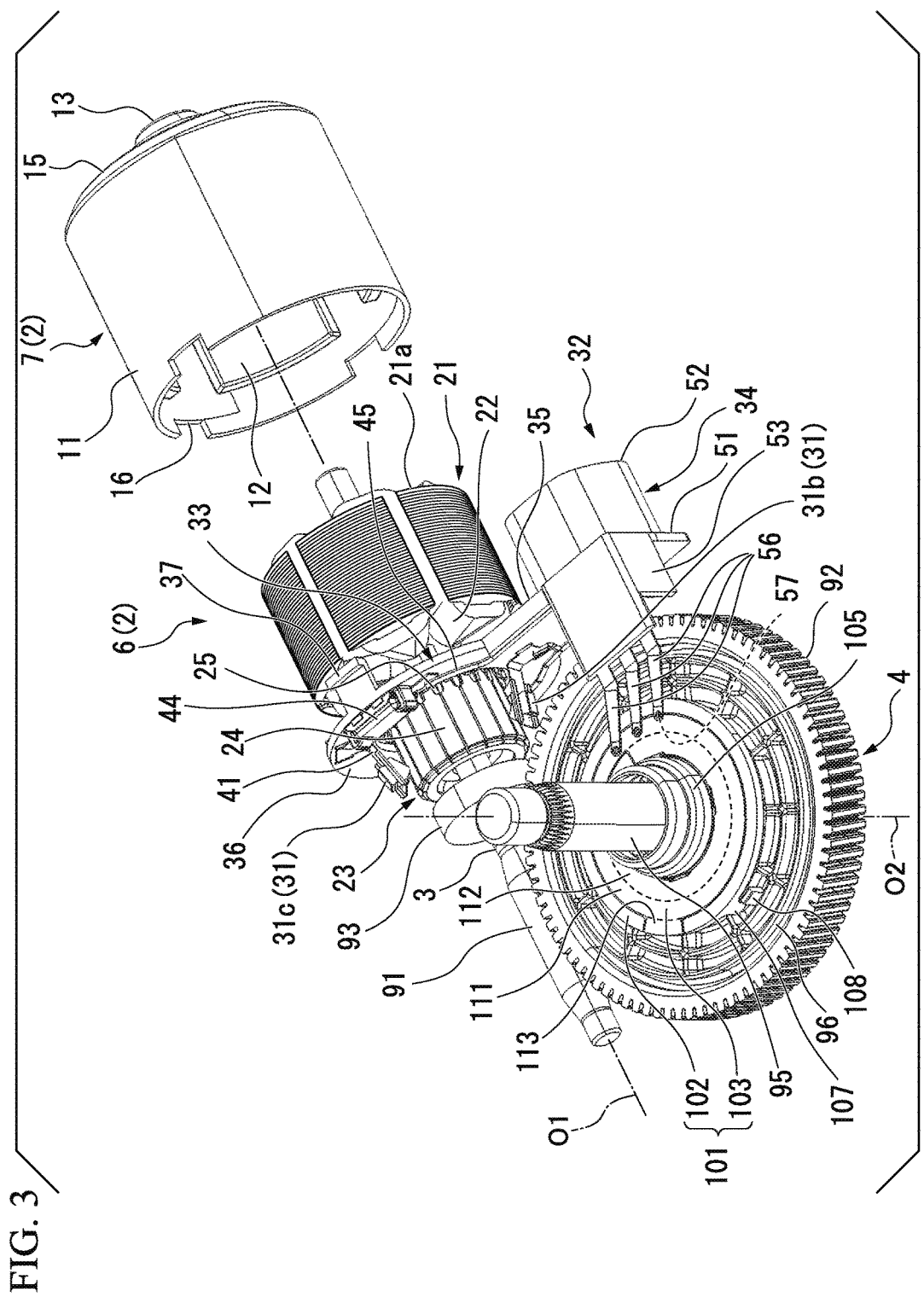
FIG. 3 is an exploded perspective view of the wiper motor.

FIG. 3 is an exploded perspective view of the wiper motor 1.

As shown in FIGS. 2 and 3, the electric motor 2 has a yoke 7 having a bottomed cylindrical shape, and an armature 6 rotatably installed in the yoke 7.

In the yoke 7, a plurality of (for example, four) magnets 12 are disposed at an inner circumferential surface of a cylindrical section 11 in a circumferential direction around the rotary shaft 3.

In a bottom wall (an end section) 15 of the yoke 7, a boss section 13 protruding toward the outside in the rotary shaft direction O1 is formed at a center in the radial direction, and a bearing 14 (see FIG. 2) configured to support a first end section of the rotary shaft 3 rotatably (the armature 6 side in the rotary shaft direction O1) is installed in the boss section 13. Further, a plurality of concave sections 16 recessed toward a first end side in the rotary shaft direction O1 are formed at an opening edge of the cylindrical section 11 at intervals in the circumferential direction.

The armature 6 includes an armature core 21 fitted onto the rotary shaft 3, an armature coil 22 wound on the armature core 21, and a commutator 23 disposed at a second end side (an opposite side to the armature 6 in the rotary shaft direction O1) with respect to the armature core 21 in the rotary shaft direction O1.

The armature core 21 is formed by laminated plate members in the rotary shaft direction O1 formed of a magnetic material through blanking such as pressing or the like. A plurality of teeth 21a on which the armature coil 22 is wound are radially formed at the armature core 21.

The commutator 23 is fitted onto the rotary shaft 3, and a plurality of segments 24 formed of a conductive material are attached to the outer circumferential surface thereof. The segments 24 are formed of plate-shaped metal pieces elongated in the rotary shaft direction O1, insulated from each other, and fixed in parallel at equal intervals in the circumferential direction while.

In each of the segments 24, a riser 25 bent and folded back outward in the radial direction is integrally formed with the first end section formed along the rotary shaft direction O1. A distal end section of the armature coil 22 is hooked around the riser 25 and fixed thereto through fusing or the like. Accordingly, the segment 24 and the armature coil 22 corresponding to the segment 24 are conducted to each other.

Connecting wires (not shown) are hooked around the risers 25 corresponding to the segments 24 configured to be the same potential, and the connecting wires are fixed to the risers 25 through fusing or the like. The connecting wires short-circuit the segments 24 configured to be the same potential, and are drawn between the commutator 23 and the armature core 21.

As shown in FIG. 3, brushes 31 come into sliding contact with the segments 24 of the commutator 23. When the brushes 31 are in sliding contact with the segments 24, current is configured to be supplied to the armature coils 22 via the segments 24. The brushes 31 are held by a holder unit 32 via brush holders 41 (to be described below).

<Holder Unit>

Figure 4:
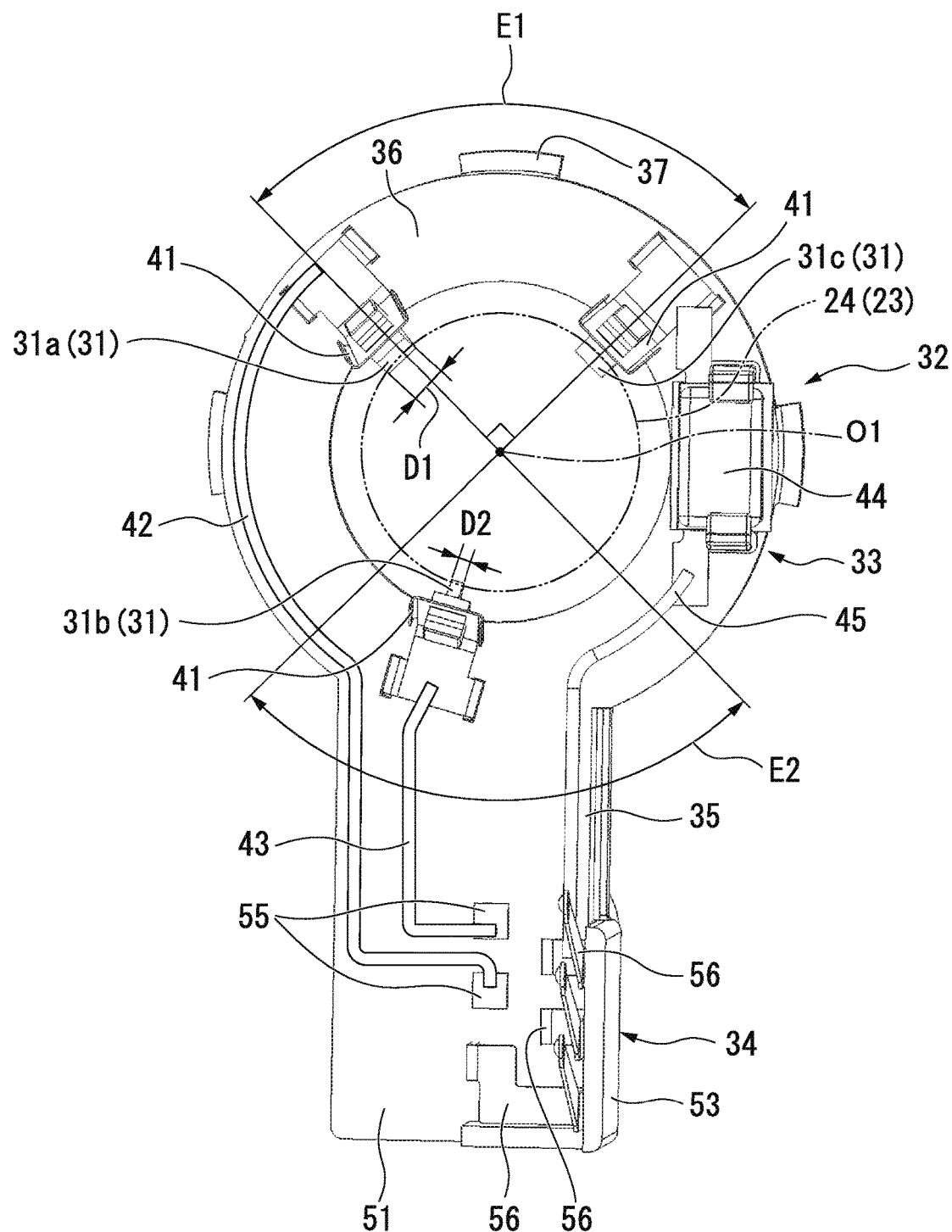
FIG. 4 is a plan view showing a holder unit when seen from the other end side in a rotary shaft direction.
Figure 5:
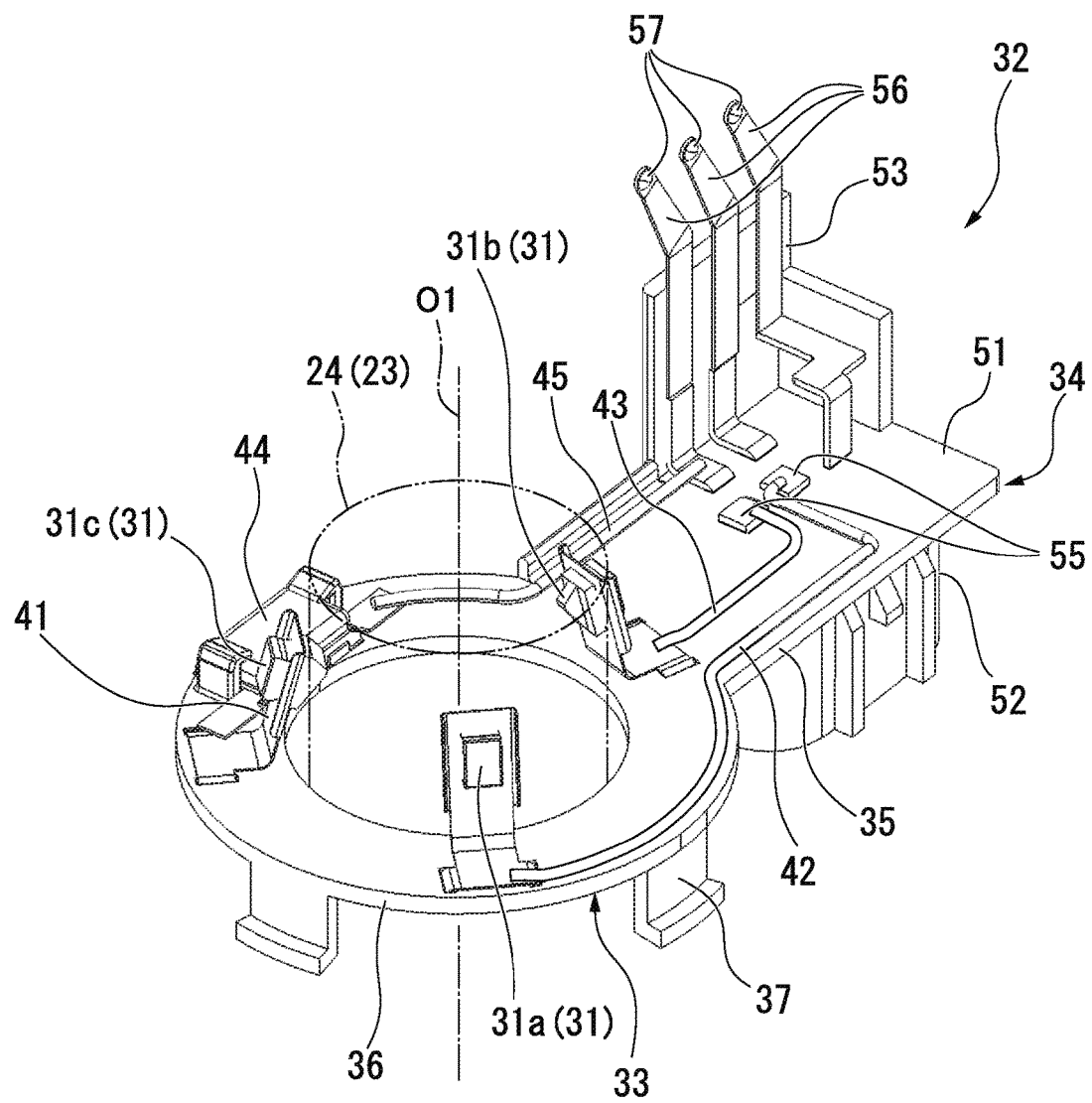
FIG. 5 is a perspective view of the holder unit.

FIG. 4 is a plan view of the holder unit 32 when seen from the second end side in the rotary shaft direction O1. FIG. 5 is a perspective view of the holder unit 32.

As shown in FIGS. 3 to 5, the holder unit 32 is constituted by a brush holder stay 33 disposed at a position overlapping the electric motor 2 in the rotary shaft direction O1, a connector section 34 disposed in the vicinity of the brush holder stay 33 in the radial direction, and a bridge section 35 bridging between the brush holder stay 33 and the connector section 34 in the radial direction, which are integrally formed with each other of a resin material or the like.

The brush holder stay 33 includes an annular holder base section 36, and positioning sections 37 protrude from an outer circumferential edge of the holder base section 36 toward the first end side of the rotary shaft direction O1. The positioning section 37 extends toward a position near the armature core 21. The front end sections of the positioning sections 37 are curved outward in the radial direction. Then, the front end sections of the positioning sections 37 are engaged with a frame section 61 (to be described below), and thus positioning of the holder unit 32 with respect to the frame section 61 in the rotary shaft direction O1 is performed. Further, an inner diameter of the holder base section 36 is set to be a size that enables insertion of the commutator 23, and the commutator 23 is inserted through the holder base section 36.

In the holder base section 36, the brush holders 41 are fixed to three places in the circumferential direction on a surface (hereinafter, simply referred to as a mounting surface) disposed at the second end side in the rotary shaft direction O1. The brush holder 41 is formed of a material having conductivity, formed in a leaf spring shape extending in the rotary shaft direction O1, and biased inward in the radial direction. Specifically, a base end section of the brush holder 41 is fixed to the holder base section 36 via a claw section (not shown). And the brush holder 41 is inclined inward in the radial direction toward the front end section. Then, the brushes 31 are installed at the front end sections of the brush holders 41 respectively to protrude inward in the radial direction.

Each of the brushes 31, when seen in a side view, is formed in a triangular shape such that a width in the rotary shaft direction O1 is gradually reduced inward in the radial direction. The base end section (an outer end section in the radial direction) of the brush 31 is fitted into the front end section of the brush holder 41, and the front end section (an inner end section in the radial direction) of the brush 31 comes into sliding contact with the segments 24 of the commutator 23. Accordingly, electric power from a battery (not shown) can be supplied to the commutator 23 via the brush 31.

Here, the brushes 31 include a brush 31a for a low speed and a brush 31b for a high speed connected to a positive electrode side, and a common brush 31c connected to a negative electrode side and commonly used for the brush 31a for a low speed and the brush 31b for a high speed.

The brush 31a for a low speed is the brush 31 used when the front wiper is driven at a low speed as a voltage is applied between the brush 31a for a low speed and the common brush 31c. In addition, the brush 31b for a high speed is the brush 31 used when the front wiper is driven at a high speed as a voltage is applied between the brush 31b for a high speed and the common brush 31c. Further, the front end section of the brush 31b for a high speed has a width in the circumferential direction reduced in comparison with the brushes 31a and 31c (D1>D2 in FIG. 4).

In addition, as shown in FIG. 4, the brush 31a for a low speed and the common brush 31c are disposed at an electrical angle of 180°, i.e., a mechanical angle (a smaller angle of central angles between the brushes 31a and 31c about the rotary shaft 3 (an inferior angle side)) of 90°. Meanwhile, the brush 31b for a high speed is disposed to be spaced a predetermined angle from the brush 31a for a low speed in the circumferential direction at a larger angle (a superior angle) side of the central angles between the brushes 31a and 31c about the rotary shaft 3.

In this case, in the holder base section 36, the brush 31a for a low speed and the common brush 31c are disposed at an opposite side of the connector section 34 with respect to the commutator 23 (the rotary shaft direction O1), and the brush 31b for a high speed is disposed at the connector section 34 side with respect to the commutator 23 (the rotary shaft direction O1). Accordingly, a distance between the brush 31b for a high speed and the connector section 34 is smaller than a distance from the brush 31a for a low speed and the common brush 31c to the connector section 34.

In addition, in an example of FIG. 4, the brush 31b for a high speed is disposed in a line symmetrical region (a second region) E2 in the radial direction opposite to an inferior angle region (a first region) E1 between the brush 31a for a low speed and the common brush 31c in the circumferential direction.

According to the above-mentioned configuration, as the brush 31a for a low speed as well as the common brush 31c and the brush 31b for a high speed are respectively disposed at the opposite regions to each other in the radial direction (the line inferior angle region E1 and the line symmetrical region E2), contact pressures of the brushes 31a to 31c with respect to the segments 24 are equally applied throughout the circumferential direction, in comparison with the configuration in which the brush 31b for a high speed is disposed in the line inferior angle region E1.

Accordingly, shaft misalignment of the rotary shaft 3 can be suppressed and a motor operating sound can be reduced.

Then, first end sections of jumper cables 42 and 43 are connected to the brush holders 41 corresponding to the brush 31a for a low speed and the brush 31b for a high speed. Second end sections of the jumper cables 42 and 43 are connected to power terminals 55 (to be described below).

In addition, a circuit breaker 44 is connected to the brush holder 41 corresponding to the common brush 31c. A first end section of a jumper cable 45 is connected to the circuit breaker 44. A second end section of the jumper cable 45 is connected to a contact plate 56 (to be described below). Further, the circuit breaker 44 is fixed to a portion disposed between the common brush 31c and the brush 31b for a high speed on the mounting surface of the holder base section 36.

The bridge section 35 is formed in a plate shape having the rotary shaft direction O1 as a thickness direction, and extends from a portion in the circumferential direction of the above-mentioned holder base section 36 toward the outside in the radial direction. The above-mentioned jumper cables 42, 43 and 45 are routed on the mounting surface of the bridge section 35 toward the connector section 34.

As shown in FIGS. 4 and 5, the connector section 34 includes a connector base section 51 extending on the same surface as the brush holder stay 33 and the bridge section 35, a connector receiving section 52 (see FIG. 5) erected from the connector base section 51 toward the first end side in the rotary shaft direction O1, and a partition section 53 erected from the connector base section 51 toward the second end side in the rotary shaft direction O1.

A plurality of power terminals 55 for power supply and a plurality of contact plates 56 for a sensor are embedded in the connector base section 51 through insert molding or the like. Further, in the example of FIG. 4, two power terminals 55 and three contact plates 56 are embedded, and arranged on the connector base section 51 at intervals from each other.

The power terminal 55 is formed in a plate shape extending in the rotary shaft direction O1, and passes through the connector base section 51. In the power terminal 55, the first end section protrudes toward the inside of the connector receiving section 52 to function as a connector terminal, and the second end section is exposed at the mounting surface side of the connector base section 51. Further, each of the above-mentioned jumper cables 42 and 43 routed from the brush 31a for a low speed and the brush 31b for a high speed are separately connected to the second end sections of the power terminals 55.

The contact plate 56 is formed in a plate shape extending in the rotary shaft direction O1 like the power terminal 55, and passes through the connector base section 51. In the contact plate 56, the first end section protrudes toward the inside of the connector receiving section 52 to function as a connector terminal, and the second end section extends toward the second end side in the rotary shaft direction O1 while curved in a crank shape. A contact point section 57 in sliding contact with a relay plate 103 (to be described below) is formed at the second end section of the contact plate 56. Further, the above-mentioned jumper cable 45 routed from the common brush 31c at the mounting surface side is connected to the one contact plate 56 of the contact plates 56.

<Gear Housing>

Figure 6:
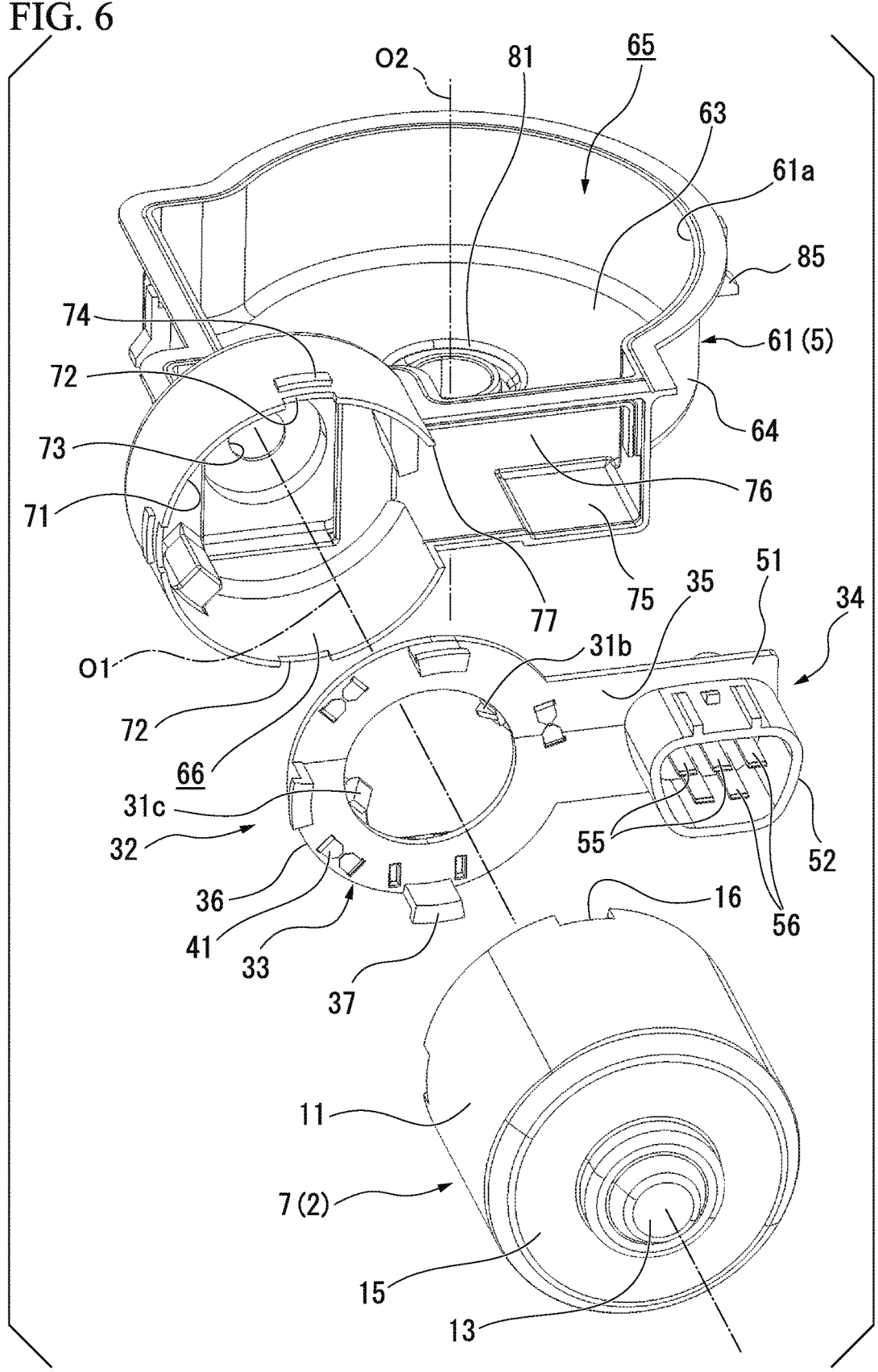
FIG. 6 is an exploded perspective view of a yoke, a gear housing and the holder unit.

FIG. 6 is an exploded perspective view of the yoke 7, the gear housing 5 and the holder unit 32.

As shown in FIGS. 2 and 6, the gear housing 5 includes the frame section 61 formed through aluminum die-casting in a bottomed cylindrical shape having a bottom wall section 63 and a circumferential wall section 64, and a bottom plate 62 formed of a resin and closing an opening section 61a of the frame section 61.

The inside of the frame section 61 is partitioned into a speed reduction mechanism housing section 65 configured to accommodate the speed reduction mechanism 4, and a holder unit housing section 66 continuing from a portion of the circumferential wall section 64 and accommodating the above-mentioned holder unit 32.

As shown in FIG. 6, first, the holder unit housing section 66 includes a first receiving section 71 having a bottomed cylindrical shape and opened toward the first end side in the rotary shaft direction O1. The first receiving section 71 has an inner diameter formed to be a size that enables reception of the above-mentioned brush holder stay 33, and the brush holder stay 33 and the commutator 23 are accommodated in the first receiving section 71.

A positioning concave section 72 with which the front end section of the positioning section 37 of the above-mentioned brush holder stay 33 is engaged is formed at an opening edge of the first receiving section 71. In addition, a positioning convex section 74 protruding toward the outside in the radial direction is formed at a portion of the first receiving section 71 disposed closer than the positioning concave section 72 to the second end side of the rotary shaft direction O1. The positioning convex section 74 is engaged with the concave section 16 of the above-mentioned yoke 7 to perform the positioning of the yoke 7 with respect to the gear housing 5.

An insertion hole 73 through which the rotary shaft 3 is inserted is formed at a bottom section of the first receiving section 71, and the first receiving section 71 and the speed reduction mechanism housing section 65 come in communication with each other via the insertion hole 73.

Figure 7:
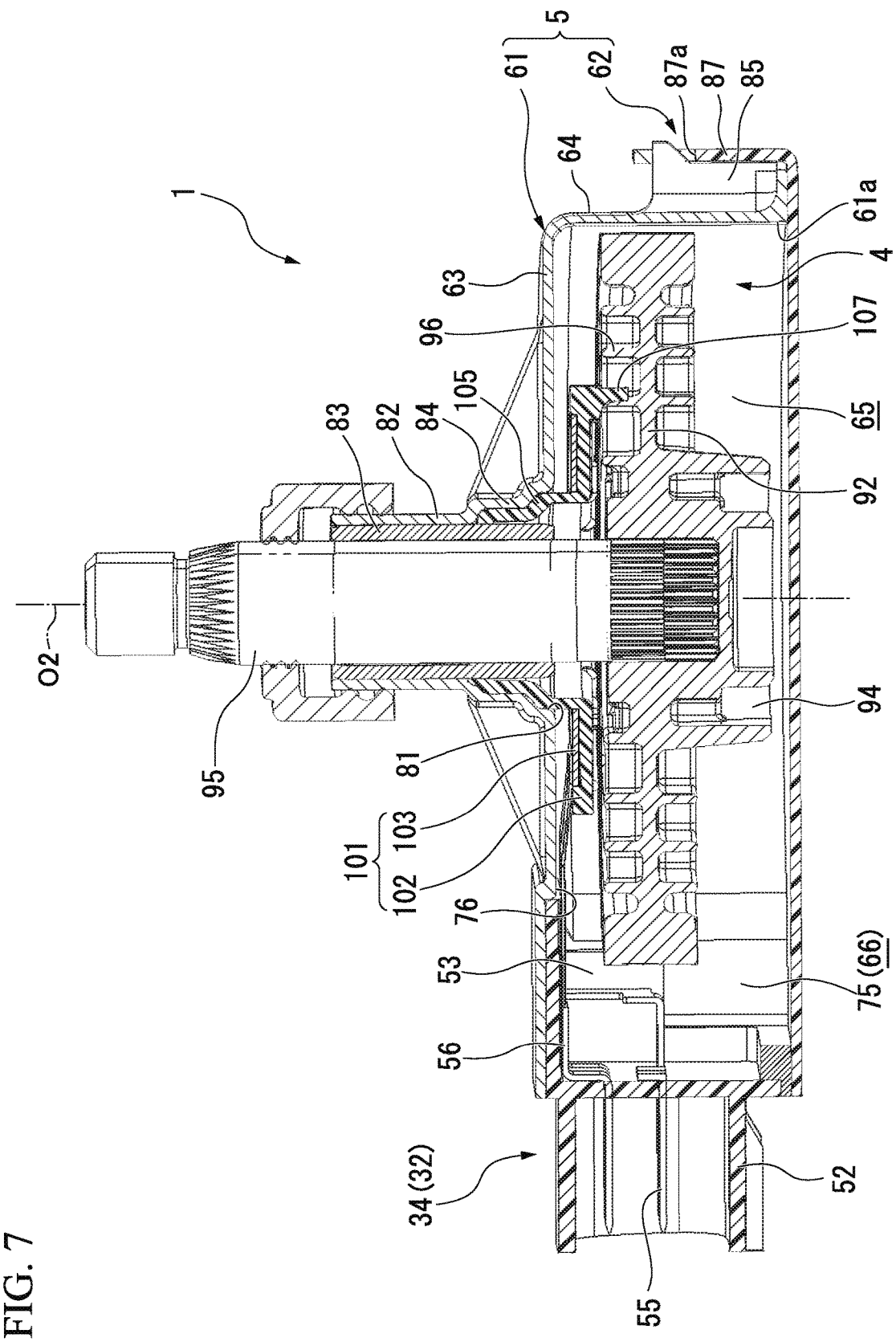
FIG. 7 is a cross-sectional view taken along line B-B of FIG. 1.

FIG. 7 is a cross-sectional view taken along line B-B of FIG. 1.

As shown in FIGS. 6 and 7, a second receiving section 75 receiving the connector section 34 and the bridge section 35 of the holder unit 32 is continuously formed from the first receiving section 71 toward the outside in the radial direction. The second receiving section 75 is formed in a prismatic shape opened in the rotary shaft direction O1, and has a size that can receive the connector section 34 and the bridge section 35 of the above-mentioned holder unit 32.

A communication hole 76 in communication with the inside of the speed reduction mechanism housing section 65 is formed in the second receiving section 75, and the second end section of the contact plate 56 is disposed to face the inside of the speed reduction mechanism housing section 65 through the communication hole 76. Furthermore, the second receiving section 75 comes in communication with the inside of the first receiving section 71 through a cutout section 77. An end section of the bridge section 35 of the holder unit 32 close to the brush holder stay 33 is accommodated in the cutout section 77.

As shown in FIG. 7, a through-hole 81 passing through the bottom wall section 63 is formed in a central section of the bottom wall section 63 in the speed reduction mechanism housing section 65. The output shaft 95 (to be described below) is inserted through the through-hole 81, and a cylindrical sleeve 82 is vertically formed at an inner circumferential edge of the through-hole 81 toward the outside in the output shaft direction O2. A diameter contraction section 84 having an inner diameter that gradually decreases toward the front end is formed at a base end section of the sleeve 82. In addition, a cylindrical slide bearing (a bush) 83 formed of an oil retaining metal or the like is installed in the sleeve 82 throughout the sleeve 82 including the diameter contraction section 84.

Further, in the sleeve 82, a gap is formed between the diameter contraction section 84 and the slide bearing 83.

In addition, in the speed reduction mechanism housing section 65, locking claws 85 protruding toward the outside of the circumferential wall section 64 are formed at the circumferential wall section 64 at intervals in the circumferential direction of the circumferential wall section 64.

The bottom plate 62 has a plate shape formed to conform to a shape of the opening section 61a of the frame section 61, and covers the opening section 61a of the frame section 61. A plurality of attachment pieces 87 protruding toward the frame section 61 are formed at an outer circumferential edge of the bottom plate 62 at intervals in the circumferential direction of the bottom plate 62. Locking holes 87a to which the locking claws 85 of the above-mentioned frame section 61 are locked are formed in the attachment pieces 87.

<Speed Reduction Mechanism>

As shown in FIGS. 2 and 7, the speed reduction mechanism 4 includes a worm 91 connected to the rotary shaft 3 of the electric motor 2, and a worm wheel 92 meshed with the worm 91.

The worm 91 has a first end section in the rotary shaft direction O1 connected to the rotary shaft 3 in the speed reduction mechanism housing section 65, and a second end section rotatably supported in the speed reduction mechanism housing section 65 by a bearing (not shown). In addition, a connecting portion of the worm 91 to the rotary shaft 3 (a second end section of the rotary shaft 3) is rotatably supported by a rolling bearing 93 (see FIG. 2) disposed at the frame section 61.

As shown in FIGS. 3 and 7, the worm wheel 92 is accommodated in the speed reduction mechanism housing section 65 as described above, and configured to be rotated according to rotation of the above-mentioned worm 91. A boss section 94 protruding toward the bottom plate 62 in the output shaft direction O2 is formed at a central section (a hub section) of the worm wheel 92. The first end section in the output shaft direction O2 of the output shaft 95 is press-fitted into the boss section 94 from the frame section 61 side.

In this case, the second end section in the output shaft direction O2 of the output shaft 95 protrudes to the outside of the frame section 61 through the sleeve 82 of the frame section 61, and an external mechanism configured to drive the front wiper (not shown) is connected to the protrusion portion. In addition, the output shaft 95 is rotatably supported in the sleeve 82 by the above-mentioned slide bearing 83.

<Relay Unit>

Here, a relay unit 101 is disposed at a surface of the worm wheel 92, located on a first end side (the frame section 61 side) in the output shaft direction O2. The relay unit 101 includes an insulator plate 102 formed of an insulating material such as a resin or the like, and the relay plate 103 disposed on the insulator plate 102.

The insulator plate 102 is formed in an annular shape having an opening section into which the output shaft 95 is inserted with a gap, and placed on a surface of the worm wheel 92 located on the first end side in the output shaft direction O2. A cylindrical insertion section (a positioning section) 105 inserted into the diameter contraction section of the above-mentioned sleeve 82 is formed at an inner circumferential edge of the insulator plate 102.

The cylindrical insertion section 105 is formed in a stepped shape having a diameter gradually decreased toward the front end section according to a shape of an inner surface of the diameter contraction section 84 of the sleeve 82. The cylindrical insertion section 105 performs the positioning in the output shaft direction O2 and in the radial direction of the relay unit 101 as the outer circumferential surface approaches or abuts the inner surface of the diameter contraction section 84. Further, the cylindrical insertion section 105 is disposed at a gap between the sleeve 82 (the diameter contraction section 84) and the slide bearing 83.

In addition, as shown in FIG. 3, a relay-side engagement section 107 protruding toward the worm wheel 92 is formed at a portion of the outer circumferential edge of the insulator plate 102 in the circumferential direction around the output shaft 95.

In addition, a worm-side engagement section 108 that can be engaged with the relay-side engagement section 107 is formed at a position of the above-mentioned worm wheel 92 opposite to the above-mentioned relay-side engagement section 107 in the circumferential direction around the output shaft 95. The worm-side engagement section 108 is disposed at a near side of the drawing in the rotational direction of the worm wheel 92 with respect to the relay-side engagement section 107, and engages with (abuts) the relay-side engagement section 107 upon rotation in a forward direction of the worm wheel 92. Further, a plurality of ribs 96 extending radially from the central section and concentric with the boss section 94 are formed at both surfaces of the worm wheel 92, and the above-mentioned relay-side engagement section 107 is disposed between the above-mentioned worm-side engagement section 108 and the rib 96 at intervals.

Then, the relay unit 101 is configured such that the relay-side engagement section 107 and the worm-side engagement section 108 are engaged with each other to be integrally rotated with the worm wheel 92 as the worm wheel 92 is rotated according to rotation of the electric motor 2.

Meanwhile, when an external force or the like is applied to the front wiper to reversely rotate the worm wheel 92, as the worm-side engagement section 108 is separated from the relay-side engagement section 107 to release engagement therebetween, the relay unit 101 is not rotated with respect to the worm wheel 92. That is, the relay-side engagement section 107 and the worm-side engagement section 108 constitute a one way clutch mechanism configured to prevent chattering between the worm wheel 92 and the relay unit 101.

As shown in FIG. 3, the relay plate 103 is formed of a material having conductivity, and disposed on the insulator plate 102 to surround the cylindrical insertion section 105. Specifically, the relay plate 103 has three contact regions 111 to 113 from the inner circumferential side to the outer circumferential side of the insulator plate 102. The contact regions 111 to 113 include the annular first contact region 111, the second contact region 112 formed in a C shape and continuously formed at the inner circumferential side of the first contact region 111, and the third contact region 113 protruding from the first contact region 111 to the outer circumferential side. Accordingly, a portion lined in the circumferential direction with the second contact region 112 and a portion lined in the circumferential direction with the third contact region 113 constitute non-conductive sections exposed by the insulator plate 102.

The contact point sections 57 of the above-mentioned contact plates 56 are configured to come into sliding contact with the contact regions 111 to 113 and the non-conductive section of the relay unit 101. In this case, as a contact position between the contact plate 56 (the contact point section 57) and the relay plate 103 is varied to cause contact/non-contact therebetween according to rotation of the worm wheel 92 (the output shaft 95), the rotational position of the output shaft 95 (a position of the front wiper) can be detected. Signal detected by the contact plates 56 is output to a control instrument (not shown) via the connector section 34, and thus rotation control of the electric motor 2 is performed.

In the wiper motor 1 having the above-mentioned configuration, when a wiper switch (not shown) is switched from an OFF position to a LOW position, a driving current is supplied from the battery to the brush 31a for a low speed of the electric motor 2. Accordingly, the electric motor 2 starts driving of a low speed operation mode. Specifically, when the electric motor 2 is driven, the speed of the driving force is reduced by the speed reduction mechanism 4, and then transmitted to an external mechanism of the front wiper via the output shaft 95. Accordingly, the front wiper can be operated to wipe off dust, raindrops, or the like, stuck to the windshield.

Meanwhile, when the wiper switch is switched to a HIGH position, the driving current is supplied from the battery to the brush 31b for a high speed of the electric motor 2. Accordingly, the electric motor 2 starts the driving of a high speed operation mode at a higher speed than the above-mentioned low speed operation mode.

Further, in the embodiment, since the front end section of the brush 31b for a high speed is smaller in the circumferential direction than those of the other brushes 31a and 31c, for example, each of the brush 31a for a low speed and the brush 31b for a high speed can be suppressed from coming into straddling contact with the two neighboring segments 24 in the circumferential direction (a short circuit state). Accordingly, rectification can be improved.

In addition, for example, when an external force or the like is applied to the output shaft 95 and the worm wheel 92 is rotated via the output shaft 95, as the engagement between the worm wheel 92 and the relay unit 101 is released, only the worm wheel 92 is rotated with respect to the relay unit 101. For this reason, the contact position between the relay unit 101 and the contact plate 56 (for example, a position of a stopped state of the wiper motor 1) can be maintained, and chattering upon position detection of the relay unit 101 and the contact plate 56 can be prevented.

<Assembly Method of Wiper Motor>

Next, an assembly method of the above-mentioned wiper motor 1 will be described. In the following description, a method of assembling the holder unit 32 to the armature 6 will be mainly described.

First, the holder unit 32 to which the brush holders 41 or the like are assembled is assembled to the frame section 61. Specifically, after the holder unit housing section 66 of the frame section 61 and the mounting surface side of the holder unit 32 are disposed to oppose each other in the rotary shaft direction O1, the holder unit 32 is accommodated in the holder unit housing section 66. Here, as the positioning section 37 of the holder unit 32 is engaged with the inside of the positioning concave section 72 of the holder unit housing section 66, the positioning in the rotary shaft direction O1 of the holder unit 32 with respect to the frame section 61 is performed.

Next, the armature 6 is assembled to the holder unit 32 that is assembled to the frame section 61. First, the armature 6 and the brush holder stay 33 of the holder unit 32 are opposed to each other in the rotary shaft direction O1. In this case, in a state in which the commutator 23 of the armature 6 is directed toward the brush holder stay 33 and the mounting surface of the brush holder stay 33 is directed toward the second end side of the rotary shaft direction O1, the armature 6 and the holder unit 32 are opposed to each other. Accordingly, in a state in which the holder unit 32 is assembled to the frame section 61, the brush holders 41 of the brush holder stay 33 are held to be inclined inward in the radial direction from the first end side toward the second end side in the rotary shaft direction O1.

In this state, the holder unit 32 approaches the armature 6 side in the rotary shaft direction O1, and the commutator 23 of the armature 6 is inserted through the opening section of the brush holder stay 33. The commutator 23 inserted into the opening section of the brush holder stay 33 enters between the brush holders 41 at the mounting surface side of the brush holder stay 33. Accordingly, as the segments 24 of the commutator 23 come into contact with the brushes 31 of the brush holders 41, the armature 6 and the holder unit 32 are assembled. After that, as the speed reduction mechanism 4, the bottom plate 62, the yoke 7, and so on, are sequentially assembled to the frame section 61 to which the holder unit 32 and the armature 6 are assembled, the wiper motor 1 is completed.

Here, in the embodiment, since the brush holder 41 extends in the rotary shaft direction O1, when the commutator 23 (the armature 6) is inserted through the brush holder stay 33 in the rotary shaft direction O1, an extending direction of the brush holder 41 and an assembly direction of the armature become the same direction. For this reason, the commutator 23 can smoothly enter between the brush holders 41 (the brushes 31a to 31c) of the brush holder stay 33 and assemblability can be improved.

In this case, even when the number of magnetic poles is four or more as in the embodiment, the brush holders 41 (the brushes 31a to 31c) can be precisely disposed at desired positions in the circumferential direction without decreasing assemblability.

In particular, since the base end section of the brush holder 41 is disposed at the entrance side in the assembly direction of the armature 6, when the commutator 23 enters between the brush holders 41, the commutator 23 enters while expanding the brush holders 41 toward the outside in the radial direction (a direction resisting the biasing force of the brush holders 41). Accordingly, since there is no need to perform the above-mentioned opening process of expanding the brush holders 41 outward in the radial direction using a jig or the like, the number of manufacturing processes and manufacturing cost can be reduced while further improving assemblability.

Further, in the embodiment, since the positioning section 37 configured to perform the positioning with respect to the frame section 61 is formed at the holder unit 32, the holder unit 32 and the frame section 61 can be positioned in the rotary shaft direction O1 via the positioning section 37. Accordingly, after the holder unit 32 is assembled to the frame section 61, as the armature 6 is assembled to the holder unit 32 as described above, the positioning in the rotary shaft direction O1 of the armature 6 with respect to the frame section 61 can be performed. Accordingly, assemblability can be further improved.

In addition, in the embodiment, since the connector section 34 and the brush holders 41 are integrally disposed at the holder unit 32, in comparison with the configuration in which the electric motor and the connector section are connected via a wiring section of the bottom plate like in the related art, a wiring length between the electric motor 2 and the connector section 34 can be reduced, the wiring layout can be simplified, and cost can be reduced.

In addition, as the relay unit 101 is disposed at the frame section 61 side while the connector section 34 or the like is disposed at the holder unit 32, a function performed by the bottom plate 62 can be reduced. Specifically, in the embodiment, a function of closing the frame section 61 and protecting the components in the frame section 61 may be satisfactory. For this reason, the bottom plate 62 can be simplified and machinability can be improved. In this case, since the bottom plate 62 can be manufactured simply by, for example, pressing or the like, the cost can be reduced even in this case. Further, in the above-mentioned embodiment, while the configuration in which the bottom plate 62 is formed of a resin material has been described, the present invention is not limited thereto but may be formed of a metal material such as aluminum or the like.

Moreover, since the cylindrical insertion section 105 of the relay unit 101 is positioned at the diameter contraction section 84 of the frame section 61, the relay unit 101 can be stably held in the gear housing 5, and assemblability of the wiper motor 1 can be improved.

In addition, since the contact plate 56 is integrally formed including the connector terminal of the first end side and the contact point section 57 of the second end side and insert-molded in the connector section 34, the number of parts and the number of manufacturing processes can be reduced.

Further, since the brushes 31a to 31c are routed to the connector section 34 via the jumper cables 42, 43 and 45, for example, in comparison with the configuration in which the brushes 31a to 31c and the connector section 34 are connected by a bus bar or the like, the wiring can be flexibly routed. Accordingly, a degree of freedom of the wiring layout can be improved.

Furthermore, in the embodiment, since the holder unit housing section 66 accommodating the holder unit 32 is formed at the frame section 61, the connector section 34 does not protrude from the gear housing 5 toward the outside when seen from the rotary shaft direction O1. That is, since an external dimension of the holder unit 32 when seen from the rotary shaft direction O1 is able to fit within an external dimension of the gear housing 5, layout characteristics upon attachment to a vehicle body or the like are improved.

Further, the technical scope of the present invention is not limited to the above-mentioned embodiment but various modifications may be made without departing from the spirit of the present invention.

For example, in the above-mentioned embodiment, while the case in which the 4-pole-3-brush electric motor 2 is employed has been described, embodiments are not limited thereto but a 6-pole or 8-pole and 3-brush electric motor 2 may be employed. However, the brush 31a for a low speed and the common brush 31c should be disposed at a mechanical angle of 60° in the case of six poles and a mechanical angle of 45° in the case of eight poles.

Then, even when multipolarized to six poles or more, as the brush 31b for a high speed is disposed at a line symmetrical region with respect to the brush 31a for a low speed and the common brush 31c, shaft misalignment of the rotary shaft 3 can be suppressed as described above.

In addition, in the above-mentioned embodiment, while the connector receiving section 52 of the connector section 34 is formed to be directed toward one side in the rotary shaft direction O1, embodiments are not limited thereto.

Figure 8:
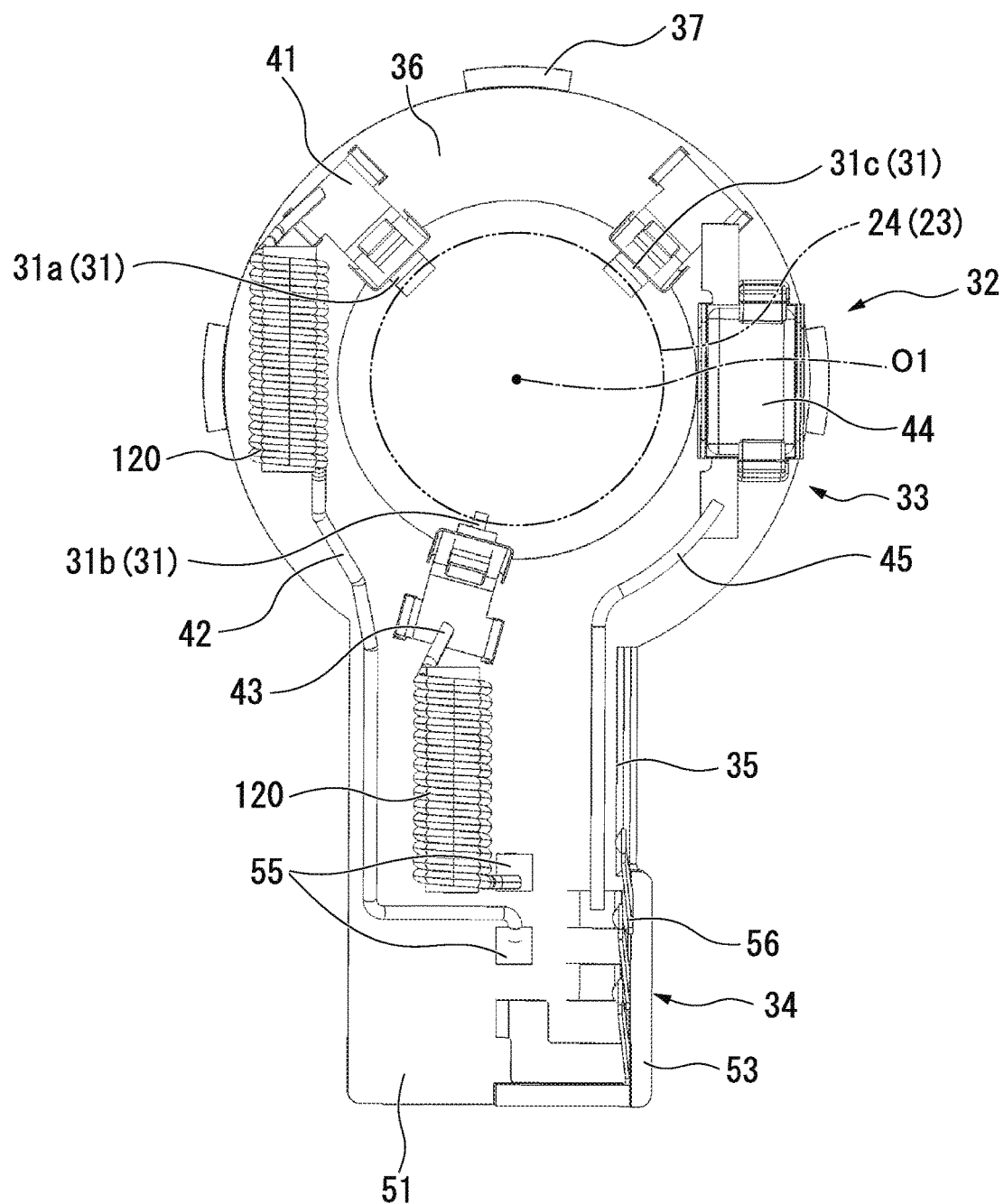
FIG. 8 is a plan view of a holder unit according to a variant of the embodiment of the present invention when seen from the other end side in the rotary shaft direction.

In addition, as shown in FIG. 8, a choke coils 120 serving as noise prevention elements may be disposed between the brushes 31a as well as 31b and the power terminal 55. In an example shown in FIG. 8, the choke coil 120 connected to the brush 31a for a low speed is disposed between the brush 31a for a low speed and the brush 31b for a high speed on the brush holder stay 33, and the choke coil 120 connected to the brush 31b for a high speed is disposed on the bridge section 35.

According to the above-mentioned configuration, as the choke coils 120 are disposed between the brush 31a for a low speed as well as the brush 31b for a high speed and the power terminal 55, electromagnetic noise can be reduced.

Furthermore, since electric parts such as the above-mentioned circuit breaker 44, the choke coil 120, or the like, can be disposed between the brushes 31a and 31b of the brush holder stay 33 or the like, or in a space on the bridge section 35 or the like, without an increase in size of the holder unit 32 or layout change, layout characteristics can be improved.

In addition, in the above-mentioned embodiment, while the connector receiving section 52 of the connector section 34 is formed to be directed toward the first end side of the rotary shaft direction O1, embodiments are not limited thereto.

Further, in the above-mentioned embodiment, while the case in which the brush holder stay 33 is formed in an annular shape has been described, embodiments are not limited thereto but the brush holder stay 33 may be formed in, for example, a U shape, as long as the commutator 23 can be inserted through.

In addition, in the above-mentioned embodiment, while the case in which the brush holder stay 33 and the connector section 34 are integrally formed as the holder unit 32 has been described, embodiments are not limited thereto.

Further, an attachment piece to the vehicle body or the front wiper may be formed at the bottom plate. Specifically, attachment pieces 131 extending along the frame section 61 in the output shaft direction O2 are formed at an outer circumferential edge of a bottom plate 130 shown in FIG. 9 at intervals in the circumferential direction around the output shaft 95. The attachment pieces 131 are disposed along the output shaft direction O2 further outside than the bottom wall section 63 of the frame section 61, and front end sections thereof are curved. In addition, an attachment hole 132 through which a fastening member (not shown) is inserted is formed at the front end section of the attachment piece 131, and the fastening member that passes through the attachment hole 132 is fastened to the vehicle body or the front wiper.

Figure 10:
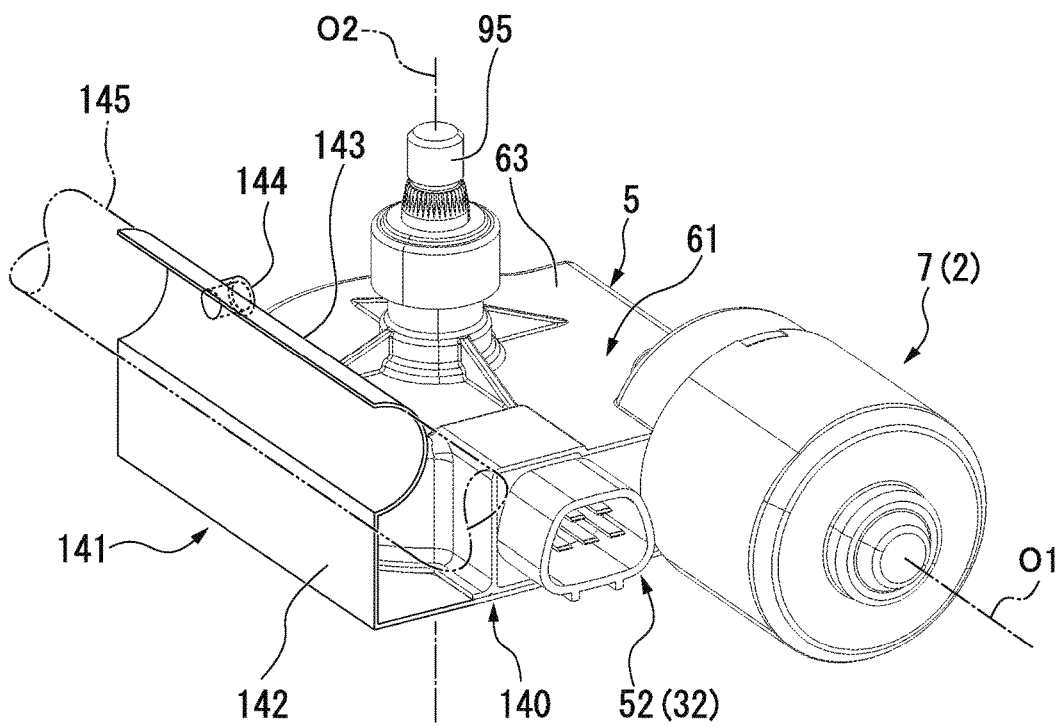
FIG. 10 is a perspective view of the wiper motor according to the variant of the embodiment of the present invention.

In addition, an attachment piece 141 extending along the frame section 61 in the output shaft direction O2 is formed at a portion of a bottom plate 140 shown in FIG. 10. The attachment piece 141 has a plate-shaped section 142 extending to the bottom wall section 63 side of the frame section 61, and a semi-cylindrical accommodating section 143 continuously formed at the front end section of the plate-shaped section 142. For example, a pipe frame 145 of the front wiper (not shown) that bridges between a pair of pivot shafts is accommodated in the accommodating section 143.

In addition, a through-hole 144 passing in the thickness direction is formed in the accommodating section 143, and the fastening member is fastened to the pipe frame 145 through the through-hole 144.

According to the above-mentioned configurations, the wiper motor 1 can be simply attached to the vehicle body or the front wiper via the bottom plates 130 and 140.

Figure 9:
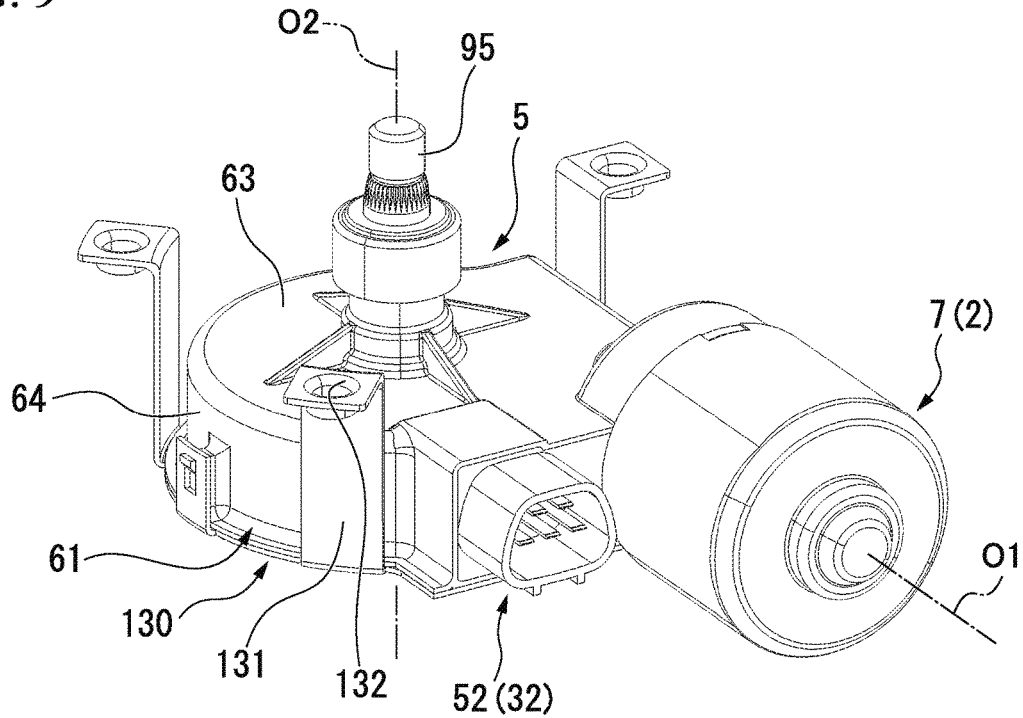
FIG. 9 is a perspective view of a wiper motor according to the variant of the embodiment of the present invention.

Further, screw threads can be directly formed in the attachment hole 132 of FIG. 9 and the through-hole 144 of FIG. 10. Accordingly, the number of parts of the fastening member configured to fasten the wiper motor 1 to the vehicle body or the front wiper can be reduced. In addition, in this case, the bottom plates 130 and 140 may be a bottom plate formed of a resin having high strength or may be a bottom plate formed of a metal such as an iron plate or the like.

In addition, in the above-mentioned embodiment, while the configuration in which the wiper motor 1 of the present invention is used to drive the front wiper has been described, the present invention is not limited thereto but may be used to drive a rear wiper or the like, or may be used for a general motor in addition to the wiper motor 1.

Additionally, the elements of the above-mentioned embodiment can be appropriately substituted with known elements without departing from the spirit of the present invention, and the above-mentioned variants can be appropriately combined.

INDUSTRIAL APPLICABILITY

According to the above-mentioned electric motor, even in the case in which multipolarization of four poles or more is attempted, brushes can be desirably disposed without deteriorating assemblability.

In addition, according to the above-mentioned electric motor, reduction in cost and simplification can be achieved.

REFERENCE SIGNS LIST 1 wiper motor (electric motor)
2 electric motor
3 rotary shaft
6 armature
7 yoke
11 cylindrical section
12 magnet
23 commutator
24 segment
31 brush
31a brush for low speed
31b brush for high speed
31c common brush
33 brush holder stay
34 connector section
41 brush holder
91 worm
92 worm wheel
120 choke coil (noise prevention element)

The invention claimed is:

1. An electric motor comprising:
a yoke having a cylindrical section;
magnets disposed at an inner circumferential surface of the cylindrical section and having 4 or more magnetic poles;
an armature attached to a rotary shaft and rotatable inside the yoke;
a commutator attached to the rotary shaft and having a plurality of segments;
a plurality of brushes in sliding contact with the segments configured to supply electric power;
brush holders holding each of the brushes separately; and
a brush holder stay supporting the brush holders,
wherein the brush holder stay has an opening section through which the commutator is able to be inserted in an axial direction of the rotary shaft,
each of the brush holder extends in the axial direction and is formed in a flat spring shape biased toward the inside in a radial direction perpendicular to the axial direction, and
base end sections of the brush holders are supported by the brush holder stay at intervals in a circumferential direction around the rotary shaft, and the brushes are held at the front end sections of the brush holders.

2. The electric motor according to claim 1, wherein the brush holder has the base end section disposed at the armature side along the axial direction, and is formed gradually away from the armature toward the front end section.

3. The electric motor according to claim 1, wherein, in the segments, the segments configured to be the same potential are short-circuited by a connecting wire, the brush comprises:
a brush for a low speed and a brush for a high speed; and
a common brush commonly used for the brush for a low speed and the brush for a high speed,
the brush for a low speed and the common brush are disposed at an interval of an electrical angle of 180° in a circumferential direction, and
the brush for a high speed is disposed in a second region opposite to a first region in the radial direction with the rotary shaft sandwiched therebetween, the first region being disposed between the brush for a low speed and the common brush in the circumferential direction.

4. The electric motor according to claim 1, wherein a connector section is configured to electrically connect the brush and also to connect to the outside is integrally formed with the brush holder stay, and
a distance between the brush for a high speed and the connector section is smaller than a distance from the brush for a low speed and the common brush to the connector section.

5. The electric motor according to claim 4, further comprising a noise prevention element disposed between the brushes and the connector section.

6. The electric motor according to claim 3, wherein the brush for a high speed has a width in the circumferential direction smaller than that of the brush for a low speed and the common brush.

7. The electric motor according to claim 1, comprising:
a speed reduction mechanism having a worm connected to the rotary shaft, and a worm wheel to which an output shaft is fixed, meshed with the worm, and configured to reduce rotation speed of the rotary shaft and to output the reduced rotation from the output shaft; and
a gear housing accommodating the speed reduction mechanism and the brush holder stay,
wherein a first positioning section configured to perform positioning in the axial direction with respect to the gear housing is formed at the brush holder stay.

8. The electric motor according to claim 7, wherein the gear housing has a bottomed cylindrical frame section accommodating the speed reduction mechanism and a bottom plate closing an opening section of the frame section,
a connector section assembled to the gear housing and having a connector terminal connected to the outside and a holder unit at which the brush holder is integrally disposed are provided,
a contact plate extending from the connector terminal toward the worm wheel is disposed at the connector section,
in the gear housing, a relay unit engaged with the worm wheel to be rotated with the worm wheel and with which the contact plate comes into contact is disposed at the frame section side, and
a second positioning section configured to be positioned at the frame section is formed at the relay unit.

9. The electric motor according to claim 8, wherein the connector terminal and the contact plate are integrally formed with each other and insert-molded in the connector section.

10. The electric motor according to claim 8, wherein the brushes are routed to the connector section via a jumper cable.

11. The electric motor according to claim 8, wherein the holder unit is disposed at a position overlapping the gear housing when seen from the axial direction of the rotary shaft.

12. The electric motor according to claim 1, wherein an attachment piece is installed at the bottom plate for enabling to attach to a vehicle body or a wiper apparatus.

* * * * *